(12) United States Patent
Schuldt et al.

(10) Patent No.: US 11,795,653 B2
(45) Date of Patent: *Oct. 24, 2023

(54) FOUNDATION FOR A WIND MILL

(71) Applicant: HOLCIM TECHNOLOGY LTD, Zug (CH)

(72) Inventors: Christian Schuldt, Holderbank (CH); Arne Stecher, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 349 days.

This patent is subject to a terminal disclaimer.

(21) Appl. No.: 17/191,144

(22) Filed: Mar. 3, 2021

(65) Prior Publication Data
US 2021/0180282 A1 Jun. 17, 2021

Related U.S. Application Data

(63) Continuation of application No. 16/077,895, filed as application No. PCT/IB2017/000064 on Feb. 1, 2017, now Pat. No. 10,968,592.

(30) Foreign Application Priority Data

Feb. 18, 2016 (AT) .................................. A 88/2016

(51) Int. Cl.
*E02D 27/42* (2006.01)
*F03D 13/20* (2016.01)

(52) U.S. Cl.
CPC ............ *E02D 27/425* (2013.01); *F03D 13/22* (2016.05)

(58) Field of Classification Search
CPC ....... E02D 27/42; E02D 27/425; F03D 13/22; E02B 17/025; E02B 2017/006; E04H 12/16
See application file for complete search history.

(56) References Cited

U.S. PATENT DOCUMENTS 4,045,929 A ‡ 9/1977 Velo Dalbrenta ......... E04H 7/20
52/223.2
4,228,627 A ‡ 10/1980 O'Neill ................... E02D 27/42
52/169.13

(Continued)

FOREIGN PATENT DOCUMENTS

CN 1784528 A 6/2006
CN 201428138 Y 3/2010

(Continued)

OTHER PUBLICATIONS

Derwent Abstract of DE 20313486 U1 (Year: 2004).‡

(Continued)

*Primary Examiner* — Brian D Mattei
*Assistant Examiner* — Charissa Ahmad
(74) *Attorney, Agent, or Firm* — Pillsbury Winthrop Shaw Pittman LLP

(57) ABSTRACT

A foundation for a wind mill includes a circular or polygonal pedestal for supporting a wind mill tower and a plurality of ribs radiating radially outwardly from the pedestal, wherein the pedestal is divided into a plurality of circumferential sections, wherein a circumferential section and a rib are each integrally formed with one another as a precast concrete element, wherein the precast concrete elements are made from reinforced concrete including a first reinforcement structure, in particular reinforcement bars, embedded into the precast concrete elements, a second reinforcement structure is provided, which holds the precast concrete elements together and which is coupled to the first reinforcement structure.

19 Claims, 4 Drawing Sheets

(56) References Cited

U.S. PATENT DOCUMENTS

Figure 1:
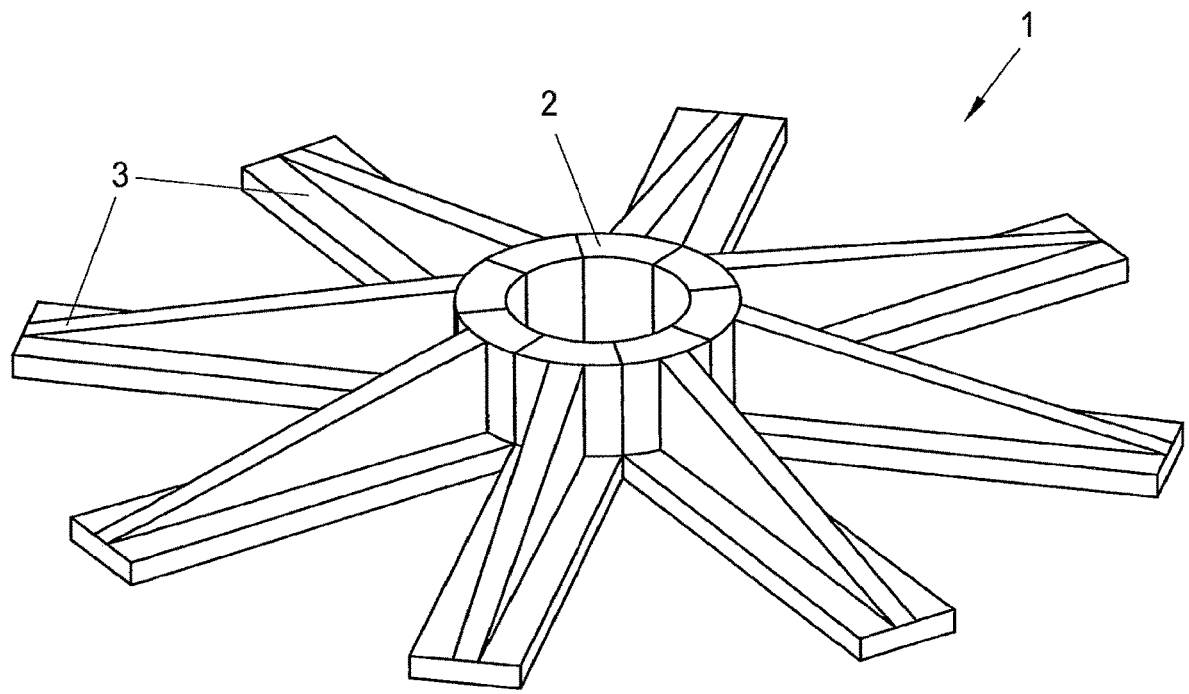

| | | | | |
|---|---|---|---|---|
| 5,586,417 | A ‡ | 12/1996 | Henderson | E02D 27/42 405/233 |
| 5,590,497 | A ‡ | 1/1997 | Moore | E04H 7/20 52/223.3 |
| 6,575,665 | B2 ‡ | 6/2003 | Richter | B63B 3/04 114/125 |
| 6,672,023 | B2 ‡ | 1/2004 | Henderson | E02D 27/42 405/244 |
| 8,499,513 | B2 ‡ | 8/2013 | Jolly | E02D 27/42 52/292 |
| 8,607,517 | B2 ‡ | 12/2013 | Jolly | E02D 27/425 52/292 |
| 8,695,297 | B2 ‡ | 4/2014 | Knisel | F03D 13/22 52/294 |
| 8,776,463 | B2 ‡ | 7/2014 | Kim | C12Q 1/04 52/295 |
| 8,833,004 | B2 ‡ | 9/2014 | Prass | E02D 27/425 52/169.1 |
| 8,904,738 | B2 ‡ | 12/2014 | Gonzalez Del Egido | E04H 12/085 52/848 |
| 9,096,985 | B1 ‡ | 8/2015 | Phuly | |
| 9,175,493 | B2 ‡ | 11/2015 | Zavitz | E04H 12/16 |
| 9,347,197 | B2 ‡ | 5/2016 | Phuly | F03D 13/22 |
| 9,803,330 | B2 ‡ | 10/2017 | Seay | E02D 27/42 |
| 10,309,074 | B2 ‡ | 6/2019 | Tozer | E02D 27/016 |
| 2007/0181767 | A1 ‡ | 8/2007 | Wobben | E02D 27/42 248/346.01 |
| 2007/0269273 | A1 ‡ | 11/2007 | Henderson | E02D 27/12 405/239 |
| 2008/0072511 | A1 ‡ | 3/2008 | Phuly | E04H 12/341 52/294 |
| 2010/0024311 | A1 ‡ | 2/2010 | Wambeke | E04H 12/085 52/40 |
| 2010/0043318 | A1 ‡ | 2/2010 | Armbrecht | F03D 13/22 52/173.1 |
| 2011/0061321 | A1 ‡ | 3/2011 | Phuly | |
| 2012/0047830 | A1 ‡ | 3/2012 | Phuly | E02D 27/42 52/294 |
| 2012/0085050 | A1 ‡ | 4/2012 | Greenwood | E04B 1/41 52/296 |
| 2012/0228442 | A1 ‡ | 9/2012 | Clifton | F24S 25/10 248/163.1 |
| 2014/0248090 | A1 ‡ | 9/2014 | Fernandez Gomez | E02B 17/025 405/196 |
| 2014/0290161 | A1 ‡ | 10/2014 | Zavitz | E04H 12/185 52/223.14 |
| 2015/0345101 | A1 ‡ | 12/2015 | Kent | E04C 5/166 52/633 |
| 2015/0376857 | A1 ‡ | 12/2015 | Clifton | E02D 27/42 52/292 |
| 2017/0152641 | A1 ‡ | 6/2017 | Serna Garc A-Conde | E04H 12/2269 |
| 2019/0055711 | A1 ‡ | 2/2019 | Schuldt | F03D 13/22 |
| 2019/0063029 | A1 ‡ | 2/2019 | Schuldt | E02D 27/425 |
| 2019/0226174 | A1 ‡ | 7/2019 | Schuldt | E02D 27/425 |
| 2020/0018035 | A1 ‡ | 1/2020 | Schuldt | E02D 27/425 |

FOREIGN PATENT DOCUMENTS

| | | | | |
|---|---|---|---|---|
| CN | 101725483 B | | 8/2014 | |
| DE | 10 2019 109503 A1 | | 10/2019 | |
| DE | 102019109503 A1 | ‡ | 10/2019 | E02D 27/425 |
| EP | 0 447 310 A | | 9/1991 | |
| EP | 447310 A | ‡ | 9/1991 | |
| JP | 01310045 A | ‡ | 12/1989 | F03D 13/22 |
| JP | 013100415 A | | 12/1989 | |
| KR | 20110092208 A | * | 8/2011 | |
| NL | 7511757 A | ‡ | 4/1976 | F03D 13/22 |
| WO | WO 2004/101898 A2 | | 11/2004 | |
| WO | WO 2005/012651 A1 | | 2/2005 | |
| WO | WO 2005012651 A1 | ‡ | 2/2005 | F03D 13/22 |
| WO | WO 2011/029994 A1 | | 3/2011 | |
| WO | WO 2011029994 A1 | ‡ | 3/2011 | E02D 27/42 |
| WO | WO 2016/016481 A1 | | 2/2016 | |
| WO | WO 2016016481 A1 | ‡ | 2/2016 | E02D 27/525 |
| WO | WO-2016187720 A1 | * | 12/2016 | |

OTHER PUBLICATIONS

Derwent Abstract of CN 106958259 A (Year: 2017).‡
International Search Report as issued in International Patent Application No. PCT/IB2017/000064, dated May 11, 2017.
Office Action as issued in Chinese Patent Application No. 201780012123.9, dated Jan. 3, 2020.
Examination Report as issued in Indian Patent Application No. 201837025023, dated Nov. 10, 2020.

\* cited by examiner
‡ imported from a related application

FOUNDATION FOR A WIND MILL

CROSS-REFERENCE TO RELATED APPLICATIONS

This application is a continuation of U.S. application Ser. No. 16/077,895, filed Aug. 14, 2018, which is the U.S. National Stage of International Application Serial No. PCT/IB2017/000064, filed Feb. 1, 2017, which in turn claims priority to Austrian Application No. A 88/2016, filed Feb. 18, 2016. The contents of all of these applications are incorporated herein by reference in their entirety.

The invention refers to a foundation for a wind mill comprising a circular or polygonal pedestal for supporting a wind mill tower and a plurality of ribs radiating radially outwardly from the pedestal, wherein the pedestal is divided into a plurality of circumferential sections, wherein a circumferential section and a rib are each integrally formed with one another as a precast concrete element, wherein the precast concrete elements are made from reinforced concrete comprising a first reinforcement structure, in particular reinforcement bars, embedded into the precast concrete elements.

Further, the invention refers to a wind turbine comprising a mast and a rotor mounted on the mast, wherein the mast is mounted onto a foundation.

A wind mill foundation of the initially defined kind is disclosed in WO 2004/101898 A2. As described therein, the manufacturing of the foundation of on-shore wind power installations requires a high manual and administrative effort and is very time consuming. Considering the increasing dimensions of modern wind turbines, the foundation is subjected to very high loads and has to be dimensioned accordingly. Today, wind turbines have a tower having a height of up to 150 m and produce up to 6 MW. In the majority of cases, the tower or mast of wind turbines is made of reinforced concrete and is build by using precast concrete elements.

Hitherto the foundations for wind power installations have been produced essentially by digging out an excavation, introducing a granular subbase, erecting a foundation component, carrying out the necessary formwork and the reinforcing work and then filling the excavation with concrete, wherein the concrete is transported to the worksite by means of ready mix trucks and poured into the excavation. The foundation component is usually of a hollow-cylindrical configuration and is generally precast and is transported as a unit to the respective assembly location.

The manufacturing of a wind mill foundation by on-site casting of concrete has a number of disadvantages. It requires complex logistics for planning the on-site manufacturing activities and it involves time-consuming and costly operations at the work site, such as building the formwork and the reinforcement structure as well as transporting concrete and casting the concrete. This is particularly true when considering that up to 1.000 m³ of concrete may be required for large foundations.

In order to improve the process of building a foundation, it has already been proposed in WO 2004/101898 A2 to build the foundation by using precast concrete elements. Such concrete elements are produced in a precast plant and are transported to the worksite, where they are put into position by using a crane and then connected with each other. In this way, the duration of the building operations at the worksite may be reduced considerably. The precast concrete elements, when connected to each other, form a foundation comprising a central pedestal and a plurality of ribs that radiate radially outwardly from the pedestal. Each precast concrete element forms one of the ribs and an associated circumferential section of the pedestal. The circumferential sections of the pedestal are connected to each other by screwed flanges. As described in WO 2004/101898 A2, the precast concrete elements may be steel-reinforced. After having built the foundation, the tower or mast of the wind mill is erected on the pedestal and fixed to the pedestal by using anchor bolts.

By using precast concrete elements, the elements can be produced in a controlled environment, so that the concrete is afforded the opportunity to properly cure and be closely monitored by plant employees. The quality of the hardened concrete may be enhanced, because there is a greater control of the quality of materials and workmanship in a precast plant rather than on a construction site. Financially, the forms used in a precast plant may be reused many times before they have to be replaced, which allow the cost of formwork per unit to be lower than for site-cast production.

Wind turbines are subjected to loads and stresses of specific nature that must be taken up by the foundation. On one hand, the wind itself acts in an unpredictable and varying manner. On the other hand, as the facilities grow larger, dynamic load components are acting on the structure due to vibrations and resonances. Further, tower heights of 100 meters and more transfer a major eccentric load to the foundation due to a substantial overturning moment that is occurring. If the tower is exposed to a bending moment, the concrete of the foundation must resist the compression that occurs in the compressed zone and the reinforcement structure of the concrete must take up the tensile force in the opposite part of the foundation, because the concrete as such has a relatively low tensile strength.

Foundations made from precast reinforced concrete elements have the advantage that the performance and the quality of the concrete are higher so that there is a reduced risk of crack-forming and better ability to resist dynamic and static loads. However, a drawback is that, in contrast to foundations casted on-site, no monolithic structure is provided, so that technical solutions must be developed for securely connecting the precast concrete elements to each other so as to simulate a monolithic structure.

Therefore, the instant invention aims at providing an improved foundation for a wind mill that is built from precast reinforced concrete elements, but that behaves similar to a monolithic foundation, in order to resist to high static and dynamic loads.

In order to solve these and other objects, the invention provides a foundation for a wind mill of the initially defined kind, comprising a circular or polygonal pedestal for supporting a wind mill tower and a plurality of ribs radiating radially outwardly from the pedestal, wherein the pedestal is divided into a plurality of circumferential sections, wherein a circumferential section and a rib are each integrally formed with one another as a precast concrete element, wherein the precast concrete elements are made from reinforced concrete comprising a first reinforcement structure, in particular reinforcement bars, embedded into the precast concrete elements, which is characterized in that a second reinforcement structure is provided, which holds the precast concrete elements together and which is coupled to the first reinforcement structure.

The second reinforcement structure may be of any kind suitable for rigidly holding the precast concrete elements together so as to form a monolithic structure. The second reinforcement structure is different from the first reinforcement structure and is therefore preferably not embedded in the precast concrete elements. According to a feature of the invention, the second reinforcement structure is coupled to the first reinforcement structure, which allows an uninterrupted load path between said reinforcement structures so that the forces introduced into the foundation are effectively distributed. Within the context of the invention, coupling the first and the second reinforcement structures means that the forces acting on the first reinforcement structure are transmitted to the second reinforcement structure without concrete being interposed and vice versa. Thus, the first and second reinforcement structures may be directly connected to each other or via a rigid connecting element other than concrete.

The first reinforcement structure preferably comprises reinforcement bars made of steel or a similar rigid material. Preferably, the reinforcement bars extend in the longitudinal direction of the ribs. Additional reinforcement bars may extend perpendicularly or obliquely to the reinforcement bars extending in the longitudinal direction of the ribs. Additional reinforcement bars may also be arranged in the pedestal and extending in the axial direction thereof. The longitudinal reinforcement bars may preferably extend in a radial direction towards the centre of the foundation, wherein the longitudinal reinforcement bars may either be arranged in a horizontal plane or extend obliquely to the horizontal plane, in particular ascending towards the pedestal. In the latter case, the reinforcement bars are substantially aligned with the load path with regard to the forces that are led off from the pedestal radially outwardly.

The second reinforcement structure preferably comprises a plurality of rigid longitudinal reinforcement elements, in particular steel beams or bars, that each connect the precast concrete elements of a pair of oppositely arranged precast concrete elements with each other in a manner traversing a hollow space encircled by the pedestal. The longitudinal reinforcement elements of the second reinforcement structure are coupled to the first reinforcement structure, in particular to the reinforcement bars, preferably to the reinforcement bars extending in the longitudinal direction of the ribs. In this way, the reinforcement bars embedded in oppositely arranged precast concrete elements are connected to each other by means of the longitudinal reinforcement elements of the second reinforcement structure, wherein a load transmitting path is formed between the first reinforcement structure of said oppositely arranged precast concrete elements. This results in that the tension load that is exerted on the foundation on account of a bending moment of the tower will not only be taken up by the first reinforcement structure arranged on one side of the foundation, but said tension load is also transferred to the first reinforcement structure arranged on the opposite side of the foundation.

According to a preferred embodiment of the invention, each pair of oppositely arranged precast concrete elements is connected by one of said rigid longitudinal reinforcement elements. In this way, a plurality of longitudinal reinforcement elements, in particular steel bars or beams, are traversing the hollow space encircled by the pedestal. Since these traversing longitudinal reinforcement elements are all arranged diametrically, they meet in the centre of the pedestal, so that a symmetrical arrangement is achieved, which provides for an optimal distribution of the forces within the entire foundation.

The longitudinal reinforcement elements may traverse the pedestal in a horizontal plane. Preferably, however, the rigid longitudinal reinforcement elements are each fixed to one of said pair of oppositely arranged precast elements in an upper region thereof and to the other of said pair of oppositely arranged precast concrete elements in a bottom region thereof, so that they are extending obliquely with respect to a horizontal plane. Therefore, the reinforcement bars of oppositely arranged precast concrete elements are coupled to each other in at least two different planes, such as the top and the bottom plane.

In this connection it is advantageous, if the rigid longitudinal reinforcement elements are connected to each other at their intersection that is arranged on a central axis of the pedestal. In this way, a central point in the axis of symmetry of the foundation is provided that allows for a load distribution in various directions.

With regard to the coupling between the first reinforcement structure and the second reinforcement structure, a preferred embodiment provides that the rigid longitudinal reinforcement elements of the second reinforcement structure and the first reinforcement structure, in particular the reinforcement bars, are connected to each other via a jacket arranged at an inner surface of the pedestal. Said jacket may be formed from a sheet steel casing that is fixed to the inner surface of the pedestal. In case of a pedestal in the form of a hollow cylinder, the jacket may be embodied as a cylindrical jacket arranged at the inner cylindrical surface of the pedestal. The jacket serves to direct the load path from the first reinforcement structure to the second reinforcement structure and vice versa. This is achieved by rigidly connecting both the reinforcement bars of the first reinforcement structure and the reinforcement elements of the second reinforcement structure to the jacket.

In this connection, a preferred embodiment provides that the reinforcement bars of said first reinforcement structure are fixed to the jacket by welding. This may advantageously be achieved by arranging the reinforcement bars of said first reinforcement structure to protrude inwardly from the precast concrete elements, and preferably penetrate openings provided in the jacket. The weld may in this case be realized at the inner side of the jacket.

Alternatively, the weld may be realized at the outer side of the jacket.

Further, the second reinforcement structure may be fixed to the jacket by welding or by a threaded connection.

The hollow space within the pedestal may be used for different purposes, e.g. as a storage space or for undertaking maintenance works, and may therefore be equipped with stairs, platforms etc. Further, the hollow space may also be used for installing, accessing and maintaining post-tension cables that are arranged to stabilize the tower or mast of the wind mill.

According to a preferred embodiment the precast concrete elements comprise a base plate for supporting the rib and are integrally formed with the same. Thus, the precast concrete element may have a cross section in the shape of an inverted "T", wherein the horizontal T-bar is formed by the base plate and the vertical T-bar is formed by the rib. However, the rib must not necessarily be realized strictly in the form of a vertical bar. The rib may also have a cross section that tapers towards the top. Further, the height of the rib may preferably continuously increase in a direction towards the pedestal. A continuously increasing height of the rib allows to adapt the cross sectional area of the rib to the force progression and may for example be realized with the upper surface or the upper rim of the rib being designed as a ramp ascending in a direction towards the pedestal. Alternatively, the rib may have a curved, namely concave, configuration of the upper surface or upper rim. In either case, the height of the rib may increase in a direction towards the pedestal so as to reach the height of the pedestal at the point where the rib merges into the pedestal.

The reinforcement bars embedded into the rib may preferably extend substantially parallel to the upper rim of the rib, in particular parallel to the ascending ramp.

The base plates of the precast concrete elements may have a rectangular shape. Alternatively, the plates may widen in the horizontal direction with increasing distance from the centre of the foundation.

In order to close the hollow space within the pedestal at its bottom, a preferred embodiment of the invention provides that said base plate comprises a rim section projecting inwardly into the hollow space encircled by the pedestal. In particular, the rim sections of all precast concrete elements together form a circumferential, in particular circular, rim, which circumferentially supports a central bottom plate that is arranged at the bottom of the pedestal.

According to a further preferred embodiment of the invention, the precast concrete elements are constrained to each other by means of at least one post-tension cable that is arranged in a circumferential, in particular circular, passage realized in the pedestal. Such cables have the function of an additional reinforcement structure, but contrary to the inventive second reinforcement structure, the cables are not coupled to the first reinforcement structure embedded into the precast concrete elements.

When constraining the precast concrete elements to each other, the side surfaces of neighbouring circumferential sections of the pedestal are pressed against each other. In order to accurately align the neighbouring circumferential sections with each other, said side faces may comprise form fitting elements, such as a tongue and groove arrangement, cooperating with each other in order to secure the relative position of the segments.

The installation of the precast concrete elements at the worksite is substantially simplified, if, in accordance with a preferred embodiment, neighbouring precast concrete elements, in their sections radiating outwardly from the pedestal, are spaced from each other in a circumferential direction. In particular, the base plates have a width dimension so that the base plates of neighbouring precast concrete elements do not touch each other. In this way, production tolerances in the production of the precast concrete elements can be accommodated.

A substantial contribution to the stability of a foundation is achieved by backfilling of the excavation with soil or other backfill material onto the precast concrete elements of the foundation. In this way, the weight of the backfill material can be used to produce a vertical load onto the precast concrete elements that counteracts an eventual overturning moment. The load is most effectively acting on vertical surfaces of the foundation, such as the base plates of the precast concrete elements. However, in order to save manufacturing and transport costs, the base plates may have a limited width so that a clearance remains between neighbouring base plates. In the region of said clearance the backfill material cannot exert a vertical load onto the foundation that would counteract the overturning moment of the wind will.

Generally, the larger the diameter of the foundation is, the better the foundation may withstand the overturning moment of the wind mill. However, the transport facilities available for transporting the precast concrete elements from the precast plant to the work site limit the possible length thereof.

In light of the above it would be desirable to increase the stability of a wind mill foundation, in particular its resistance to an overturning moment, without increasing the length and/or width of the precast concrete elements that form the pedestal and the ribs of the foundation. To this end, a preferred embodiment of the invention provides that the clearance between two neighbouring precast concrete elements is each bridged by a bridging plate, said bridging plate preferably having a radial extension so as to radially protrude from the precast concrete elements. The bridging plates are preferably realized as precast concrete plates. As the bridging plates are elements that are separate from the precast concrete elements that form the pedestal and the ribs of the foundation, they can be handled and transported separately. The bridging plates extend the horizontal surface area, onto which the backfilling material exerts a vertical force that counteracts the overturning moment of the wind mill. In particular, the surface area is extended to at least part of the clearance between neighbouring base plates and optionally to an area that is radially outside the diameter of the foundation as defined by the precast concrete elements that form the pedestal and the ribs. The bridging plates, at least along part of their edge, are supported by the base plates, so that the vertical load exerted by the backfilling material on the bridging plates may be transferred onto the foundation including the precast concrete elements.

Alternatively or additionally, a flat flexible material, such as a textile sheet material, a mat or a geomembrane may be arranged to cover the base plates, the ribs and/or the bridging plates. The flat material may fulfil the same function as the bridging plates, which is to extend the surface, onto which the weight of the backfilling material is resting. The flat flexible material may be fixed to the pedestal and/or the ribs and/or the bridging plates by means of suitable connection elements, such as, e.g., hooks, eyes or threaded connections.

The concrete used to produce the precast concrete elements may be any type of concrete that is also typically used for casting in-situ concrete. In addition to aggregates and water, concrete contains Portland cement as a hydraulic binder, which produces strength-forming phases by reacting and solidifying in contact with water.

Fibre reinforced concrete may also be used to produce the precast concrete elements. The fibres may be made of any fibrous material that contributes to increasing the structural integrity, in particular the strength, the impact resistance and/or the durability, of the resulting concrete structure. Fibre-reinforced concrete contains short discrete reinforcement fibres that are uniformly distributed and randomly oriented.

Preferably, the reinforcement fibres are carbon fibres, synthetic fibres, in particular polypropylene fibres. Alternatively, the reinforcement fibres may be steel fibres, glass fibres, or natural fibres.

In operation, the foundation carries an on-shore wind turbine comprising a mast and a rotor mounted on the mast, wherein the mast is mounted onto the pedestal of the inventive foundation with conventional means, such as by means of anchor bolts. The rotor has a horizontal rotation axis.

Figure 3:
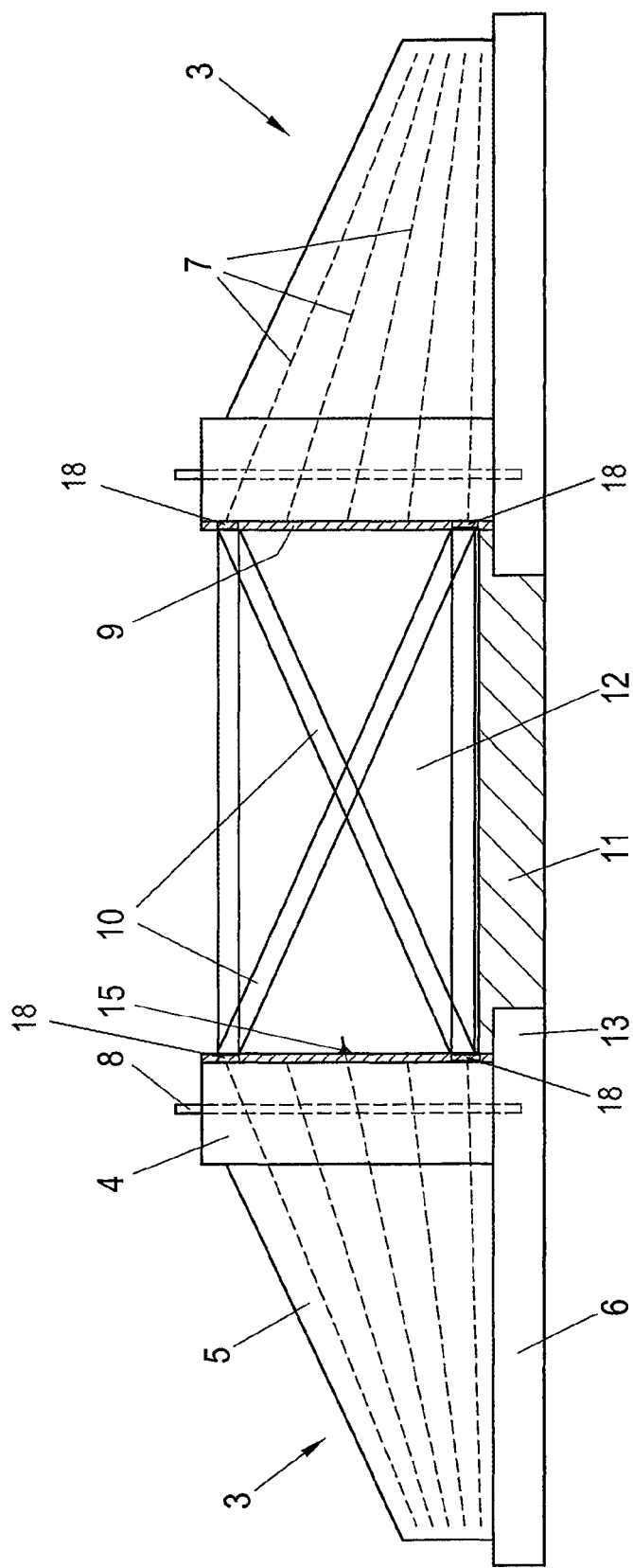
Figure 4:
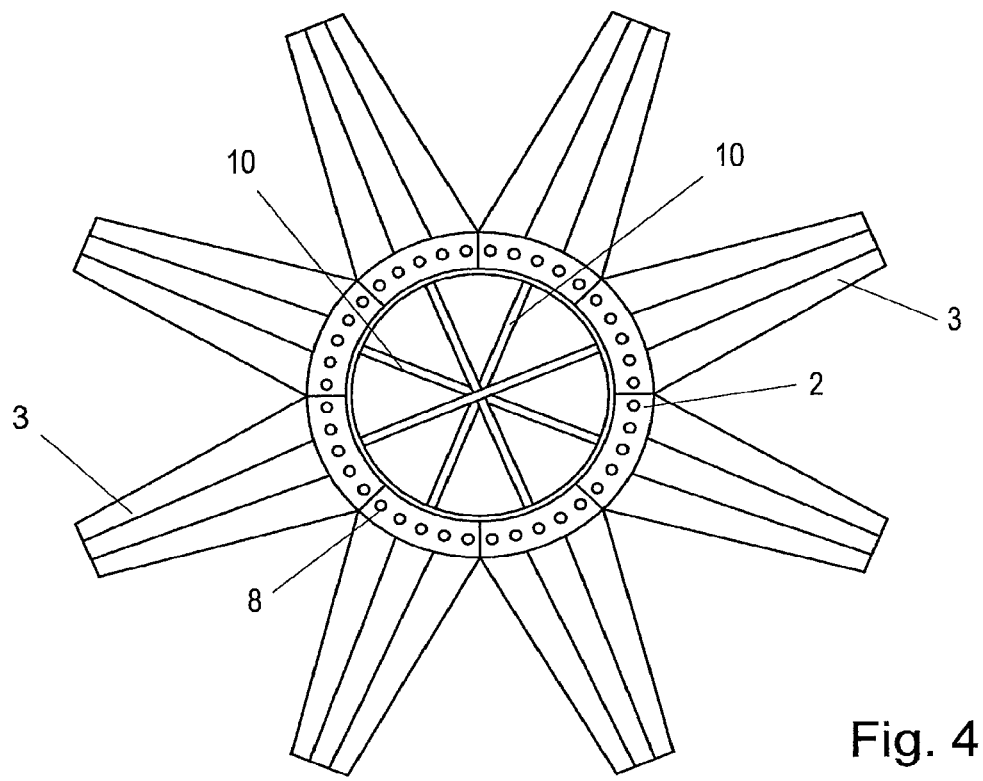
Figure 5:
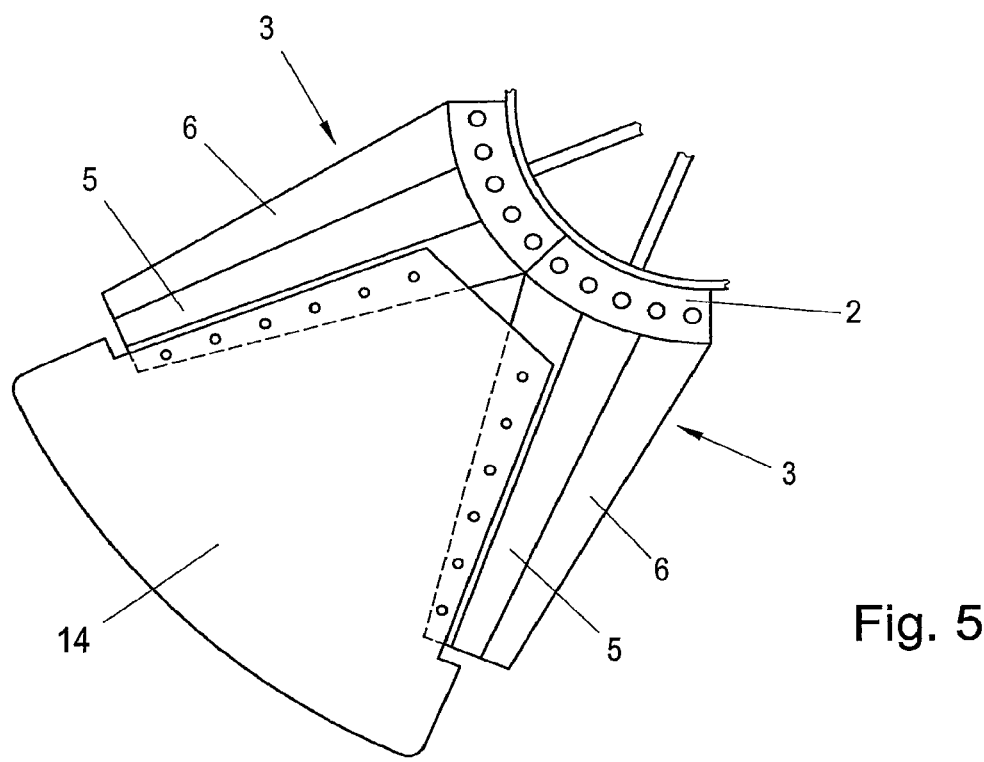
Figure 6:
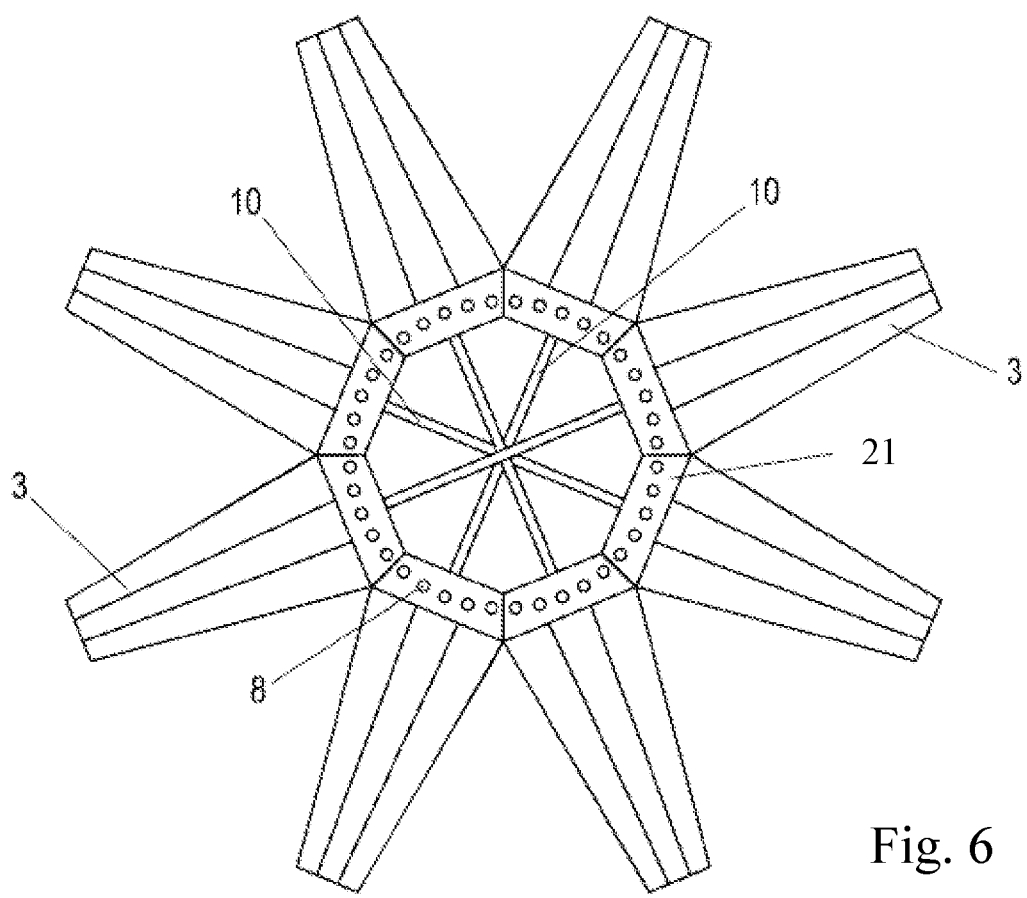

In the following, the invention will be described in more detail by reference to an exemplary embodiment shown in the drawings. FIG. 1 illustrates a wind mill foundation consisting of precast concrete elements, FIG. 2 shows a precast concrete element as used in the foundation of FIG. 1, FIG. 3 shows a cross section of the foundation according to the invention, FIG. 4 shows a top view of the foundation of FIG. 3, FIG. 5 is a partial top view of a modified embodiment of the foundation and FIG. 6 shows a top view of a foundation comprising a polygonal pedestal.

In FIG. 1 a foundation 1 is shown that comprises a number of precast concrete elements 3. The foundation 1 comprises a circular pedestal 2 in the form of a hollow cylinder for supporting a wind mill tower. The foundation 1 further comprises a plurality of ribs 5 radiating radially outwardly from the pedestal 2. The pedestal 2 is divided into a plurality of circumferential sections 4 (FIG. 2), wherein a circumferential section 4 and a rib 5 are each integrally formed with one another as a precast concrete element 3, as shown in FIG. 2. The precast concrete element 3 further comprises a base plate 6 that is also integrally formed with the rib 5. The precast concrete elements 3 are made from reinforced concrete comprising reinforcement bars that are embedded into the precast concrete elements 3.

Figure 2:
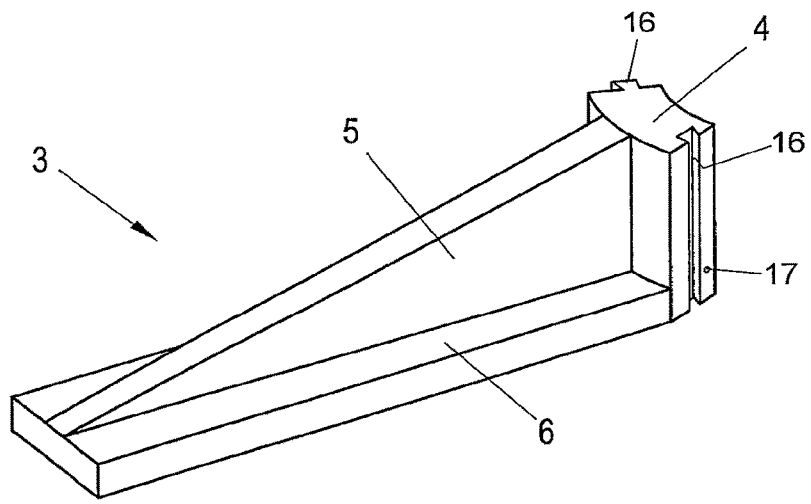

Although the ribs are shown in FIG. 2 as a precast concrete element made in a single piece, the ribs may also be assembled from two or more rib sections. This is particularly advantageous, if a rib is to be realized that has a radial length that exceeds the allowable length of usual transporting facilities. In particular, two or more rib sections may be produced as separate precast concrete elements, transported to the work site separately and rigidly mounted together at the work site.

In order to accurately align the neighbouring circumferential sections 4 with each other, said side faces may comprise form fitting elements 16, such as a trapezoidal tongue and groove arrangement, cooperating with each other in order to secure the relative position of the elements 3. Further, the precast concrete elements 3 may be constrained to each other by means of at least one post-tension cable that can be arranged in a circumferential, in particular circular, passage realized in the pedestal 2, the opening of the passage being denoted by 17. Of course, a plurality of passages may be provided.

The reinforcement bars embedded into the precast concrete elements 3 are shown in FIG. 3 and designated by reference numeral 7. Further, anchor bolts 8 are shown, that are embedded into the circumferential sections 4 of the pedestal 2 and serve to fix the tower of the wind mill at the free ends thereof that are protruding from the pedestal 2.

A jacket 9 is arranged at the inner cylindrical surface of the pedestal 2. The reinforcement bars 7 are arranged to protrude inwardly from the precast concrete elements 3 and penetrate openings 18 (see FIG. 3) provided in the jacket 9, so that the bars 7 may be connected to the jacket 9 at the inner side thereof by welding (the welding connection is shown at 15 as an example only at one of the bars 7). Further, steel beams 10 are each connected to the jacket 9 by, e.g., a screwed connection. The steel beams 10 connect oppositely arranged precast concrete elements 3 with each other in a manner traversing a hollow space 12 encircled by the pedestal 2. At least part of the steel beams 10 are extending obliquely so as to form an "X"-configuration, wherein the beams 10 are each fixed to one of the oppositely arranged precast elements 3 in an upper region thereof and to the other of the oppositely arranged precast concrete elements 3 in a bottom region thereof.

As can be seen in FIG. 3, the base plate 6 of each precast concrete element 3 comprises a rim section projecting inwardly into the hollow space 12, wherein the rim sections of all precast concrete elements 3 together form a circular rim 13, which circumferentially supports a central bottom plate 11 that is arranged at the bottom of the pedestal 2.

FIG. 4, in a top view of the foundation of FIG. 3 shows that each pair of oppositely arranged precast concrete elements 3 is connected with each other by steel beams 10.

FIG. 5 shows an embodiment, in which the clearance between two neighbouring precast concrete elements 3 is each bridged by a bridging plate 14, that has a radial extension so as to radially protrude from the precast concrete elements 3. The bridging plate 14 may be fixed to the base plate 6 of the precast concrete elements 3 by means of bolts.

FIG. 6 is a top view of a foundation comprising a polygonal pedestal 21.

The invention claimed is:

1. A foundation for a wind mill comprising a polygonal pedestal for supporting a wind mill tower and a plurality of ribs radiating radially outwardly from the pedestal, wherein the pedestal is divided into a plurality of sections, wherein a section and a rib are each integrally formed with one another as a precast concrete element, wherein the precast concrete elements are made from reinforced concrete comprising a first reinforcement structure embedded into the precast concrete elements, wherein a second reinforcement structure is provided, which holds the precast concrete elements together and which is coupled to the first reinforcement structure, and wherein the first and the second reinforcement structure are directly coupled to each other, wherein the second reinforcement structure comprises a plurality of rigid longitudinal reinforcement elements that each connect the precast concrete elements of a pair of oppositely arranged precast concrete elements with each other in a manner traversing a hollow space within the pedestal and wherein the rigid longitudinal reinforcement elements are each fixed to one of said pair of oppositely arranged precast elements in an upper region thereof and to the other of said pair of oppositely arranged precast concrete elements in a bottom region thereof so that the rigid longitudinal reinforcement elements meet in the center of the pedestal and are extending obliquely with respect to a horizontal plane so as to form an X-configuration.

2. A foundation according to claim 1, wherein a height of the rib continuously increases in a direction towards the pedestal.

3. A foundation according to claim 1, wherein each pair of oppositely arranged precast concrete elements is connected by one of said rigid longitudinal reinforcement elements.

4. A foundation according to claim 1, wherein the precast concrete elements are constrained to each other by means of at least one post-tension cable that is arranged in a passage realized in the pedestal.

5. A foundation according to claim 1, wherein the rigid longitudinal reinforcement elements are connected to each other at their intersection that is arranged on an axis of the pedestal.

6. A foundation according to claim 1, wherein the rigid longitudinal reinforcement elements and the first reinforcement structure are connected to each other via a jacket arranged at an inner surface of the pedestal.

7. A foundation according to claim 6, wherein the first reinforcement structure includes reinforcement bars and wherein the reinforcement bars of said first reinforcement structure are fixed to the jacket by welding.

8. A foundation according to claim 6, wherein the first reinforcement structure includes reinforcement bars and wherein the reinforcement bars of said first reinforcement structure are arranged to protrude inwardly from the precast concrete elements, and penetrate openings provided in the jacket.

9. A foundation according to claim 6, wherein the second reinforcement structure is fixed to the jacket by welding or by a threaded connection.

10. A foundation according to claim 1, wherein the precast concrete elements comprise a base plate for supporting the rib and integrally formed with the same.

11. A foundation according to claim 10, wherein rim sections of all precast concrete elements together form a bottom rim, which supports a central bottom plate that is arranged at the bottom of the pedestal.

12. A foundation according to claim 10, wherein the base plate comprises a rim section projecting inwardly into the hollow space within the pedestal.

13. A foundation according to claim 1, wherein neighbouring precast concrete elements radiating outwardly from the pedestal are spaced from each other in a circumferential direction.

14. A foundation according to claim 1, wherein a clearance between two neighbouring precast concrete elements is each bridged by a bridging plate.

15. A foundation according to claim 14, wherein the bridging plates are realized as precast concrete plates.

16. A foundation according to claim 14, wherein the bridging plate has a radial extension so as to radially protrude from the precast concrete elements.

17. A wind turbine comprising a mast and a rotor mounted on the mast, wherein the mast is mounted onto a foundation according to claim 1.

18. A foundation according to claim 1, wherein the first reinforcement structure includes reinforcement bars.

19. A foundation according to claim 1, wherein the rigid longitudinal reinforcement elements are steel beams or bars.

\* \* \* \* \*